(No Model.)
M. FLEISHER.
TANK.
No. 284,402. Patented Sept. 4, 1883.
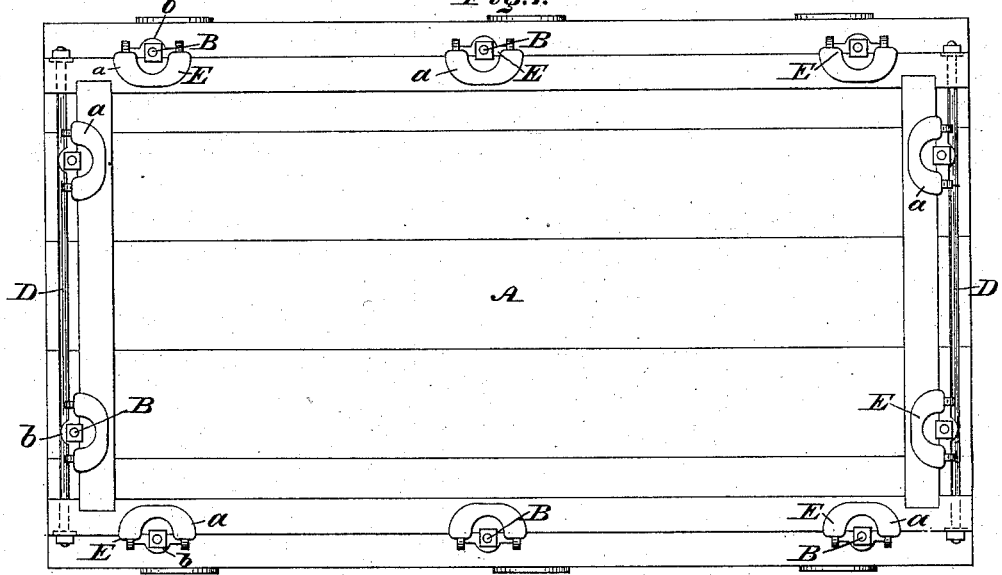
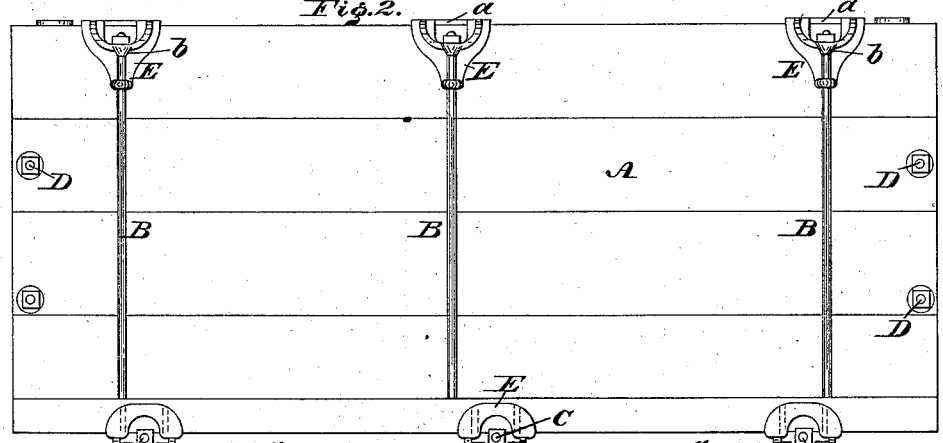
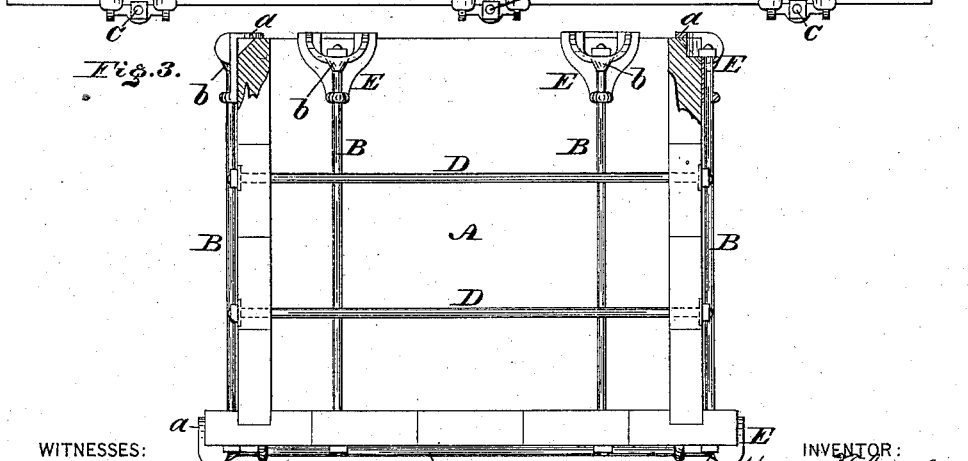
WITNESSES:
A. P. Grant
W. F. Kirches
INVENTOR:
Meyer Fleisher
BY John A. Wiedersheim
ATTORNEY.

Table of contents:
UNITED STATES PATENT OFFICE.

MOYER FLEISHER, OF PHILADELPHIA, PENNSYLVANIA.

TANK.

SPECIFICATION forming part of Letters Patent No. 284,402, dated September 4, 1883.

Application filed March 30, 1883. (No model.)

*To all whom it may concern:*

Be it known that I, MOYER FLEISHER, a citizen of the United States, residing in the city and county of Philadelphia, State of Pennsylvania, have invented a new and useful Improvement in Tanks, which improvement is fully set forth in the following specification and accompanying drawings, in which—

Figure 1 is a top or plan view of a tank embodying my invention. Fig. 2 is a side elevation thereof; Fig. 3, an end view, partly sectional.

Similar letters of reference indicate corresponding parts in the several figures.

My invention consists of a tank, more especially adapted for holding acid, dye-stuffs, &c., having its securing or clamping devices located on the outside, so as to be removed from the injurious action of the contents of the tank, said devices consisting of clamps provided with flanges, which overlap the edges of the tank and bosses, through which bolts are passed, said bolts having nuts fitted to them, the operation being hereinafter fully set forth.

Referring to the drawings, A represents a tank formed of side, end, and bottom pieces.

B represents the vertical clamping-bolts at the sides of the tank, C the horizontal clamping-bolts at the bottom of the tank, and D the horizontal clamping-bolts at the ends of the tank, the several bolts being on the outside of the tank.

E represents clamps, each of which is formed with a flange, $a$, whereby the clamp may be connected with the tank by engaging with an edge thereof, and the clamp has also a boss, $b$, through the opening of which a bolt may be passed, the head or nut of one end of the latter resting against the boss.

The clamps for the bolts B depend from the top edge of the tank, and the upper ends of said bolts have their heads or nuts bear against the bosses of the clamps. The lower ends of the bolts pass through the sides of the bottom of the tank, and may have said ends headed or provided with nuts to tighten against the bottom, it being evident that one end of each bolt may be headed and the other end threaded for engagement of a nut, or both ends threaded, so that each end has a tightening-nut.

If desired, clamps may be employed at the bottom of the tank for connection of the bolts with said bottom.

The clamps for the bottom bolts, C, are fitted to the edges of the bottom of the tank, and said bolts are tightened by means of nuts on one or both of their ends, and the bolts D are tightened against the ends of the said pieces; or said ends may be provided with clamps similar to those for the side and bottom bolts.

It will be seen that by tightening the bolts the several parts of the tank may be clamped together, forming tight and secure joints and a strong structure.

It will also be seen that the bolts are on the outer side of the tank and outside of the walls thereof, whereby they are protected from the corrosive or other injurious action of the contents of the tank, and the walls of the tank are also preserved from the damaging effect of corroded or rusted bolts.

The tank possesses increased strength, as it is not pierced in its sides for the upright bolts, nor in its bottom for the horizontal bolts, and the bolts do not obstruct the interior of the tank, and are not inconvenient, as located on the outside thereof. Furthermore, the nuts of the bolts may be readily tightened and loosened, and the bolts easily removed and applied.

The tank, as shown, is made of wood.

Having thus described my invention, what I claim as new, and desire to secure by Letters Patent, is—

The clamps provided with flanges $a$, which overlap the edges of a tank, and bosses $b$, in combination with the bolts passed through said bosses, and the clamping-nuts which operate on said bolts, substantially as set forth.

MOYER FLEISHER.

Witnesses:
JOHN A. WIEDERSHEIM,
A. P. GRANT.